US011323682B2

(12) United States Patent
Nakata

(10) Patent No.: US 11,323,682 B2
(45) Date of Patent: May 3, 2022

(54) ELECTRONIC DEVICE, CONTENT PROCESSING DEVICE, CONTENT PROCESSING SYSTEM, IMAGE DATA OUTPUT METHOD, AND IMAGE PROCESSING METHOD

(71) Applicant: Sony Interactive Entertainment Inc., Tokyo (JP)

(72) Inventor: Masashi Nakata, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 8 days.

(21) Appl. No.: 17/255,769

(22) PCT Filed: Jul. 2, 2018

(86) PCT No.: PCT/JP2018/025107
§ 371 (c)(1),
(2) Date: Dec. 23, 2020

(87) PCT Pub. No.: WO2020/008511
PCT Pub. Date: Jan. 9, 2020

(65) Prior Publication Data
US 2021/0266514 A1    Aug. 26, 2021

(51) Int. Cl.
*H04N 13/139*    (2018.01)
*H04N 19/167*    (2014.01)
(Continued)

(52) U.S. Cl.
CPC ............ *H04N 13/139* (2018.05); *G06N 3/08* (2013.01); *H04N 13/128* (2018.05);
(Continued)

(58) Field of Classification Search
CPC .... H04N 13/139; H04N 13/128; H04N 13/15; H04N 13/161; H04N 19/132;
(Continued)

(56) References Cited

U.S. PATENT DOCUMENTS 10,075,689 B2    9/2018  Zhang
2010/0119157 A1  5/2010  Kameyama
(Continued)

FOREIGN PATENT DOCUMENTS

EP    0999518 A1    5/2000
JP    2001250120 A   9/2001
(Continued)

OTHER PUBLICATIONS

International Preliminary Report on Patentability and Written Opinion for corresponding PCT Application No. PCT/JP2018/025107, 14 pages, dated Jan. 14, 2021.
International Search Report for corresponding PCT Application No. PCT/JP2018/025107, 4 pages, dated Sep. 25, 2018.

*Primary Examiner* — Jared Walker
(74) *Attorney, Agent, or Firm* — Matthew B. Dernier, Esq.

(57) ABSTRACT

An image processing device acquires a captured image and a depth image. A region dividing section divides the plane of the captured image into regions by determining distance values indicated by the depth image with respect to a preset threshold value (region-divided image). A compressing section generates and outputs data of a captured image having different levels of detail in the respective regions, with respect to the resolution and the number of gradations representing pixel values of the captured image, according to the result of the region division.

13 Claims, 9 Drawing Sheets

(51) Int. Cl.
*H04N 19/132* (2014.01)
*H04N 19/136* (2014.01)
*H04N 13/128* (2018.01)
*H04N 13/15* (2018.01)
*H04N 13/161* (2018.01)
*G06N 3/08* (2006.01)

(52) U.S. Cl.
CPC ........... *H04N 13/15* (2018.05); *H04N 13/161* (2018.05); *H04N 19/132* (2014.11); *H04N 19/136* (2014.11); *H04N 19/167* (2014.11)

(58) Field of Classification Search
CPC .. H04N 19/136; H04N 19/167; H04N 13/106; H04N 13/194; H04N 2013/0081; H04N 13/239; H04N 19/172; H04N 19/20; G06N 3/08; G06N 3/04; G06V 10/143; G06V 20/20; G06V 20/64
See application file for complete search history.

(56) References Cited

U.S. PATENT DOCUMENTS

| | | | |
|---|---|---|---|
| 2013/0004082 A1* | 1/2013 | Kano | G06T 5/002 382/255 |
| 2016/0088207 A1* | 3/2016 | Yamamoto | G06T 5/008 348/362 |
| 2016/0094835 A1* | 3/2016 | Takanashi | H04N 13/207 348/54 |
| 2016/0212405 A1 | 7/2016 | Zhang | |
| 2017/0109852 A1* | 4/2017 | Ito | G06V 40/172 |
| 2017/0330312 A1* | 11/2017 | Nam | H04N 5/202 |
| 2018/0165801 A1* | 6/2018 | Kim | H04N 5/57 |

FOREIGN PATENT DOCUMENTS

| | | |
|---|---|---|
| JP | 2009049976 A | 3/2009 |
| JP | 2013128260 A | 6/2013 |
| JP | 2014110509 A | 6/2014 |
| JP | 2015521820 A | 7/2015 |
| WO | 2014005301 A1 | 1/2014 |

\* cited by examiner

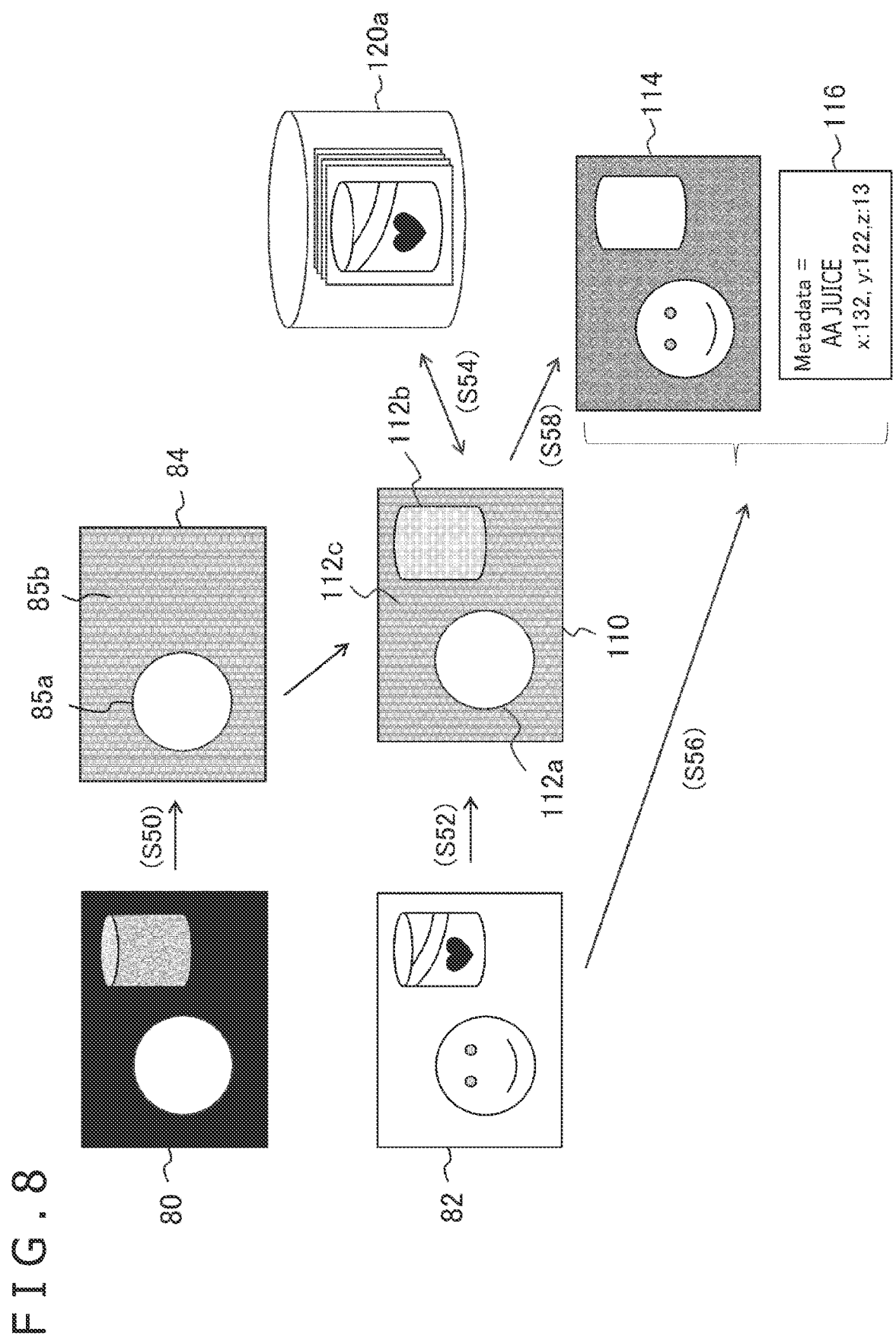

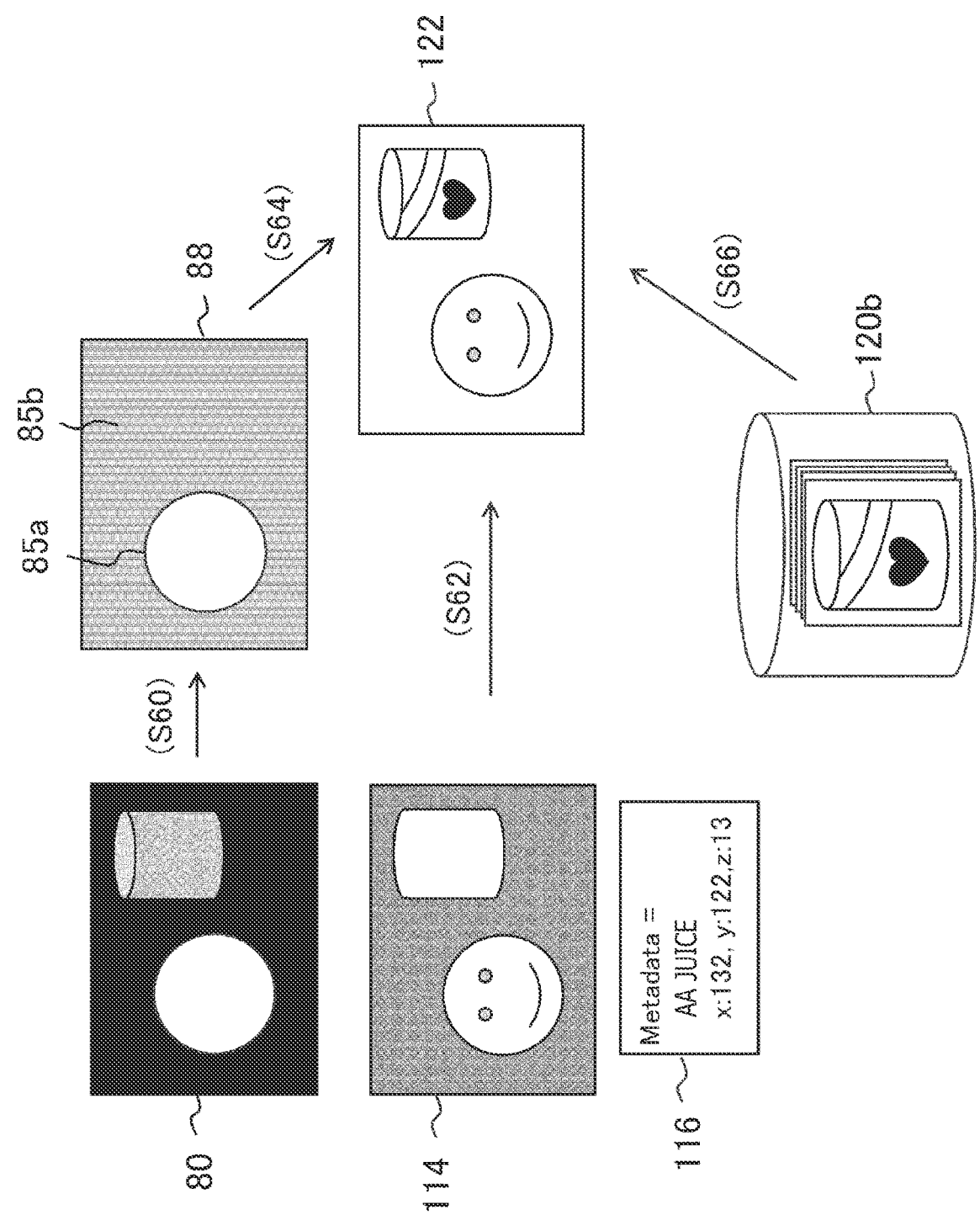

ELECTRONIC DEVICE, CONTENT PROCESSING DEVICE, CONTENT PROCESSING SYSTEM, IMAGE DATA OUTPUT METHOD, AND IMAGE PROCESSING METHOD

TECHNICAL FIELD

The present invention relates to an image processing device that outputs a captured image, a content processing device that performs a processing sequence by using the captured image, a content processing system including the image processing device and the content processing device, and an image processing method to be carried out by the image processing device and the content processing device.

BACKGROUND ART

There is known a game in which an image of a part of the body of a user such as the head of the user is captured by a video camera, predetermined regions of the image such as an eye, a mouth, and a hand are extracted from the image, the regions are replaced with other images, and those images are displayed on a display (see, for example, PTL 1). Further, there is also known a user interface system that receives the motion of a mouth or a hand whose image has been captured by a video camera as an operation command of an application. Such a technology that captures an image of a real world and displays a virtual world responsive to the motion of the image or performs some information processing sequence responsive thereto has been used in a wide range of scale-independent fields from small mobile terminals to leisure facilities.

CITATION LIST

Patent Literature

[PTL 1] European Patent Application Publication No. 0999518

SUMMARY

Technical Problems

For realizing realistic image renderings or performing highly accurate image processing sequences, it is desirable to increase the resolution or frame rate of captured images and displayed images. However, since the increased resolution or frame rate results in an increased amount of data to be processed, it leaves problems to be solved in terms of immediacy and responsiveness. Specifically, even if attempts are made to achieve higher resolutions and higher frame rates, latency from image capturing to image displaying tends to increase unless the speed of data transfer between devices is high enough. Increases in latency are likely to be aggravated particularly in situations where motions in a real world are to be immediately reflected in information processing sequences or displayed images.

The present invention has been made in view of the problems. It is an object of the present invention to provide a technology that is capable of reducing latency caused by transmission in a content processing system using captured images.

Solution to Problems

An aspect of the present invention relates to an electronic device. The electronic device includes a captured image acquiring section that acquires a captured image representing a luminance distribution of visible light in a subject space, a sensor image acquiring section that acquires an image representing a distribution of measured values regarding the subject space that is different from the luminance distribution of the visible light, a data compressing section that divides the captured image into regions on the basis of boundary conditions on the measured values and establishes different levels of detail for the respective regions thereby to reduce data from the captured image, and an output section that outputs the captured image from which the data has been reduced, and information regarding the regions.

Here, the "electronic device" may be a device that performs an image processing sequence, such as an information processing terminal, an information processing device, or a server connectable to various devices through a network, or an integrated circuit or the like as part of those devices. Alternatively, the "electronic device" may be an image capturing device or an integrated circuit as part of the image capturing device.

Another aspect of the present invention relates to a content processing device. The content processing device includes a data acquiring section that acquires data of an image having different levels of detail in respective regions of a captured image representing a luminance distribution of visible light in a subject space, and acquires information regarding the regions, an image reproducing section that reproduces data of the captured image having a common format in its entirety on the basis of the information regarding the regions, and an output section that generates and outputs output data by using the reproduced data of the captured image.

Here, the "content processing device" may be a device that processes content, such as a head-mounted display, an information processing terminal, an information processing device, or a server connectable to various kinds of devices through a network, or an integrated circuit or the like as part of those devices.

Still another aspect of the present invention relates to a content processing system. The content processing system includes an electronic device that transmits a captured image representing a luminance distribution of visible light in a subject space and a content processing device that generates output data by using the captured image. The electronic device includes a captured image acquiring section that acquires the captured image, a sensor image acquiring section that acquires an image representing a distribution of measured values regarding the subject space that is different from the luminance distribution of the visible light, a data compressing section that divides the captured image into regions on the basis of boundary conditions on the measured values and establishes different levels of detail for the respective regions thereby to reduce data from the captured image, and an output section that outputs the captured image from which the data has been reduced, and information regarding the regions. The content processing device includes a data acquiring section that acquires the captured image from which the data has been reduced, and the information regarding the regions, an image reproducing section that reproduces data of the captured image having a common format in its entirety on the basis of the information regarding the regions, and an output section that generates and outputs output data by using the reproduced data of the captured image.

A still further aspect of the present invention relates to an image data output method. The image data output method of outputting image data with an electronic device includes a step of acquiring a captured image representing a luminance distribution of visible light in a subject space, a step of acquiring an image representing a distribution of measured values regarding the subject space that is different from the luminance distribution of the visible light, a step of dividing the captured image into regions on the basis of boundary conditions on the measured values and establishing different levels of detail for the respective regions thereby to reduce data from the captured image, and a step of outputting the captured image from which the data has been reduced, and information regarding the regions.

A yet still further aspect of the present invention relates to an image processing method. The image processing method of processing an image with a content processing device includes a step of acquiring data of an image having different levels of detail in respective regions of a captured image representing a luminance distribution of visible light in a subject space, and acquiring information regarding the regions, a step of reproducing data of the captured image having a common format in its entirety on the basis of the information regarding the regions, and a step of generating and outputting output data by using the reproduced data of the captured image.

Note that any combinations of the above components, and expressions of the present invention as converted between methods, devices, systems, computer programs, and recording media recording computer programs therein are also effective as aspects of the present invention.

Advantageous Effect of Invention

According to the present invention, it is possible to reduce latency caused by transmission in a content processing system using captured images.

BRIEF DESCRIPTION OF DRAWINGS

FIG. 8 is a diagram schematically illustrating a processing sequence performed by the data compressing section of the image processing device in a mode where the images of subjects are excluded from a transmission target by a subject recognizing function in the embodiment.

FIG. 9 is a diagram schematically illustrating a sequence in which data generated by the processing sequence illustrated in FIG. 8 is reproduced by the image reproducing section of the content processing device.

DESCRIPTION OF EMBODIMENT

Figure 1:
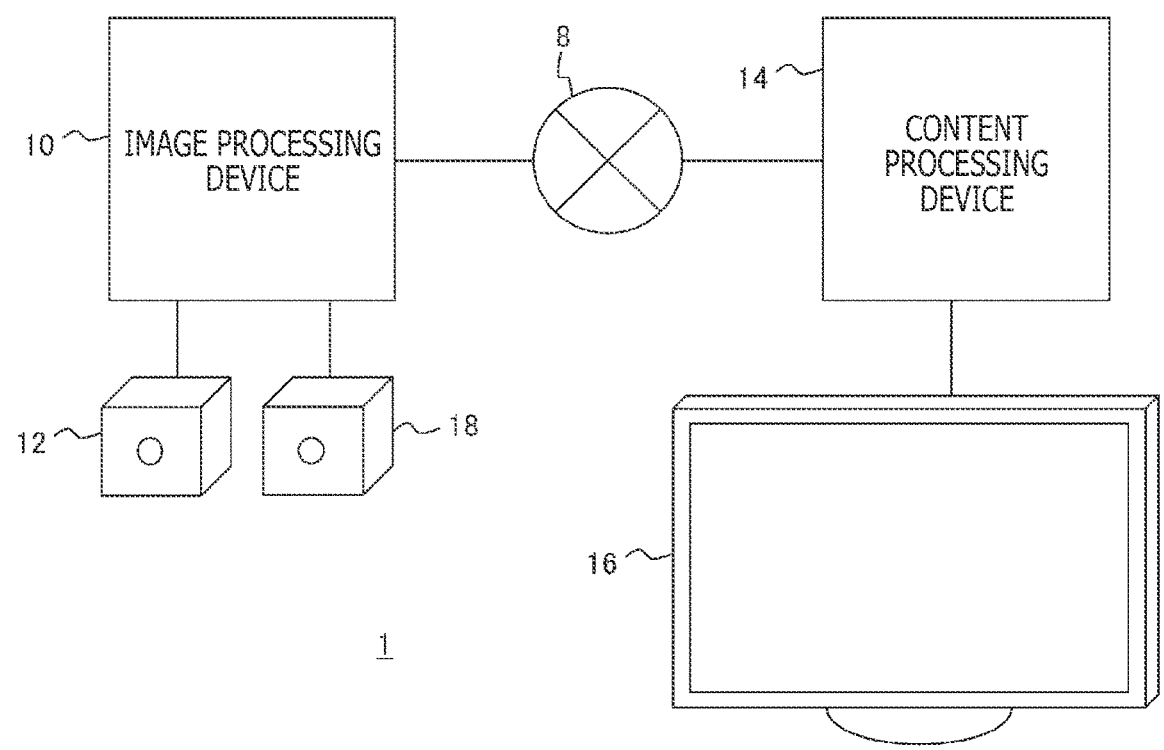
FIG. 1 is a diagram illustrating a configurational example of a content processing system according to an embodiment of the present invention.

FIG. 1 illustrates a configurational example of a content processing system according to an embodiment of the present invention. The content processing system, denoted by 1, includes an image capturing device 12 that captures an image of a real space, a sensor 18 that acquires information of a subject, an image processing device 10 that outputs data of the captured image, a content processing device 14 that performs a predetermined information processing sequence by using the captured image, and a display device 16 that outputs the result of the information processing sequence. The image processing device 10 and the content processing device 14 establish communication with each other through a network 8. The network 8 may be a wide-area communication network such as the Internet or may be a local network such as LAN (Local Area Network).

The image processing device 10 and the image capturing device 12, the image processing device 10 and the sensor 18, and the content processing device 14 and the display device 16 may be connected by cables or may be wirelessly connected by a wireless LAN or the like. Alternatively, two or more of these devices and devices may be integrally combined with each other. For example, the image processing device 10, the image capturing device 12, and the sensor 18 may be combined into an image capturing device or electronic device having a function to transmit data to the network 8, or may be included as part of a server that distributes content data. Further, the image capturing device 12, the sensor 18, the image processing device 10, and the display device 16 may be combined into a head-mounted display.

The image capturing device 12, the sensor 18, the image processing device 10, the content processing device 14, and the display device 16 are thus not limited to illustrated appearances, shapes, and connected states. In addition, input devices, not illustrated, may be connected to the image processing device 10 and the content processing device 14. Moreover, a server, not illustrated, having a database that stores images of subject candidates as described later may be connected to the network 8.

The image capturing device 12 includes a general image sensor such as a CMOS (Complementary Metal Oxide Semiconductor) sensor and captures a still image or moving image representing a luminance distribution of visible light in a subject space. The sensor 18 acquires predetermined information regarding a subject or subject space whose image is captured by the image capturing device 12. Here, information that is finally acquired by the sensor 18 is different from the luminance distribution of visible light acquired by the image capturing device 12.

The sensor 18 may be, for example, a depth camera that generates a depth image representing the distance up to a subject as a pixel value. In this case, the sensor 18 includes a mechanism that applies reference light such as a near-infrared radiation to a subject space and a CMOS sensor that detects reflected light from the subject space. The sensor 18 derives the distance up to the subject on the basis of an elapsed time from the application of the reference light until the detection of the reflected light or on the basis of a distortion of a distribution of the reflected light. The former technique is a technology generally known as a ToF (Time of Flight) process, and the latter technique is a technology generally known as a pattern projection process.

Alternatively, the sensor 18 may be a stereo camera system including two cameras disposed in respective left and right positions spaced a predetermined distance from each other. In this case, the sensor 18 extracts corresponding points from a pair of luminance images of a subject that are captured by the two cameras and derives the distance up to the subject according to the principles of triangulation using the difference between the positions of the points as parallax. A ranging technology using a stereo camera system is also generally known. Note that, in this case, one of the cameras of the stereo camera system may be the image capturing device 12.

Further alternatively, the sensor 18 may be a multispectral camera that detects electromagnetic waves in several tens of wavelength bands including wavelengths other than visible light rays or may be a hyperspectral camera that detects electromagnetic waves in a greater number of wavelength bands. In any case, physical quantities detected by the sensor 18 are not limited to any kinds as long as they represent data regarding a real space that can be expressed as a distribution in a plane corresponding to the field of vision of the image capturing device 12. A distribution of measured values regarding a subject space that are acquired by the sensor 18 may hereinafter be referred to as a "sensor image."

The image processing device 10 compresses or otherwise processes a captured image from the image capturing device 12 and a sensor image from the sensor 18 into a transmission form and sends the images to the content processing device 14 through the network 8. Specifically, the image processing device 10 divides the captured image into regions on the basis of boundary conditions on measured values represented by the sensor image and establishes different levels of detail for the respective regions. Qualitatively, important regions and other regions are distinguished from each other on an image plane, and data of the latter regions is reduced by lowering the resolution or reducing the number of gradations representative of pixel values, thereby reducing the amount of data to be transmitted. The image processing device 10 outputs the captured image whose data has thus been reduced and information regarding the distinguished regions, e.g., the sensor image itself.

The content processing device 14 generates a display image by using the data transmitted thereto. At this time, the content processing device 14 specifies the regions whose data has been reduced by using the information regarding the regions, e.g., the sensor image, and restores the data format of those regions, thereby giving the common data format to the entire image. In a case where the data reduction is lossy, the levels of detail of those regions cannot fully be restored, but the levels of detail of at least the important regions are maintained. The process of restoring the data format will hereinafter referred to as "reproduction."

The content processing device 14 performs an information processing sequence and generates output data of display images and sounds, by using the reproduced captured image. The content processing device 14 can also use the sensor image at this time. Stated otherwise, the sensor image required for image processing can be used to divide regions for data reduction, so that the amount of data to be transmitted can efficiently be reduced.

Note that the output data to be generated by the content processing device 14 is not limited to any particular content and may be various kinds of data depending on functions of the system required by the user and content of activated applications. For example, the content processing device 14 may plot a virtual object that interacts with the subject on the captured image, by specifying the position of the subject in the real space on the basis of a depth image generated by the sensor 18. Alternatively, the content processing device 14 may proceed with a game by converting a motion of the subject into a command input and generate a screen image of the game.

The display device 16 includes a display such as a liquid crystal display, a plasma display, or an organic EL (Electroluminescent) display that outputs images, and a speaker that outputs sounds, and the display device 16 outputs, as images and sounds, output data supplied from the content processing device 14. The display device 16 may be a television receiver, any of various monitors, a portable terminal display screen, a camera's electronic viewfinder, or the like, or may be a head-mounted display to be mounted on the head of the user for displaying images before the user's eyes.

Figure 2:
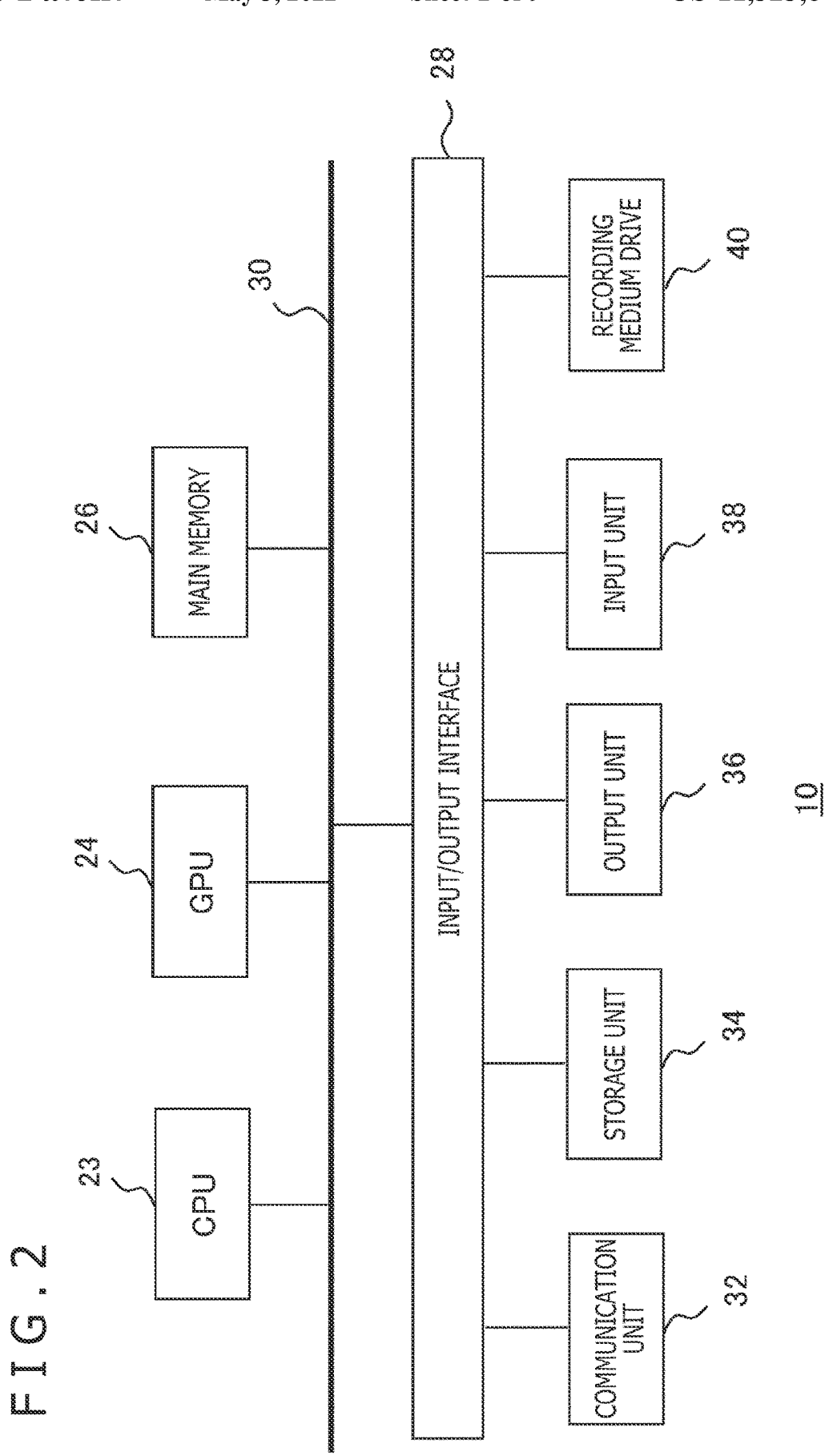
FIG. 2 is a diagram illustrating an internal circuit arrangement of an image processing device according to the embodiment.

FIG. 2 illustrates an internal circuit arrangement of the image processing device 10. The image processing device 10 includes a CPU (Central Processing Unit) 23, a GPU (Graphics Processing Unit) 24, and a main memory 26. The CPU 23, the GPU 24, and the main memory 26 are connected to each other by a bus 30. An input/output interface 28 is also connected to the bus 30. To the input/output interface 28, there are connected a communication unit 32 including a peripheral device interface such as a USB (Universal Serial Bus) or IEEE (Institute of Electrical and Electronic Engineers) 1394 interface and a network interface such as a wired or wireless LAN, a storage unit 34 such as a hard disk drive or a nonvolatile memory, an output unit 36 that outputs data to external devices, an input unit 38 that receives data from the image capturing device 12, the sensor 18, and input devices not illustrated, and a recording medium drive 40 that drives a removable recording medium such as a magnetic disk, an optical disk, or a semiconductor memory.

The CPU 23 controls the image processing device 10 in its entirety by executing an operating system stored in the storage unit 34. The CPU 23 also executes various programs read from the removable recording medium and loaded into the main memory 26 or downloaded via the communication unit 32. The GPU 24 functions as a geometry engine and a rendering processor, performs a rendering process according to a rendering command from the CPU 23, and outputs image data to the output unit 36. The main memory 26 includes a RAM (Random Access Memory) and stores programs and data required for processing sequences. Note that the content processing device 14 may have an internal circuit arrangement similar to the internal circuit arrangement illustrated in FIG. 2.

Figure 3:
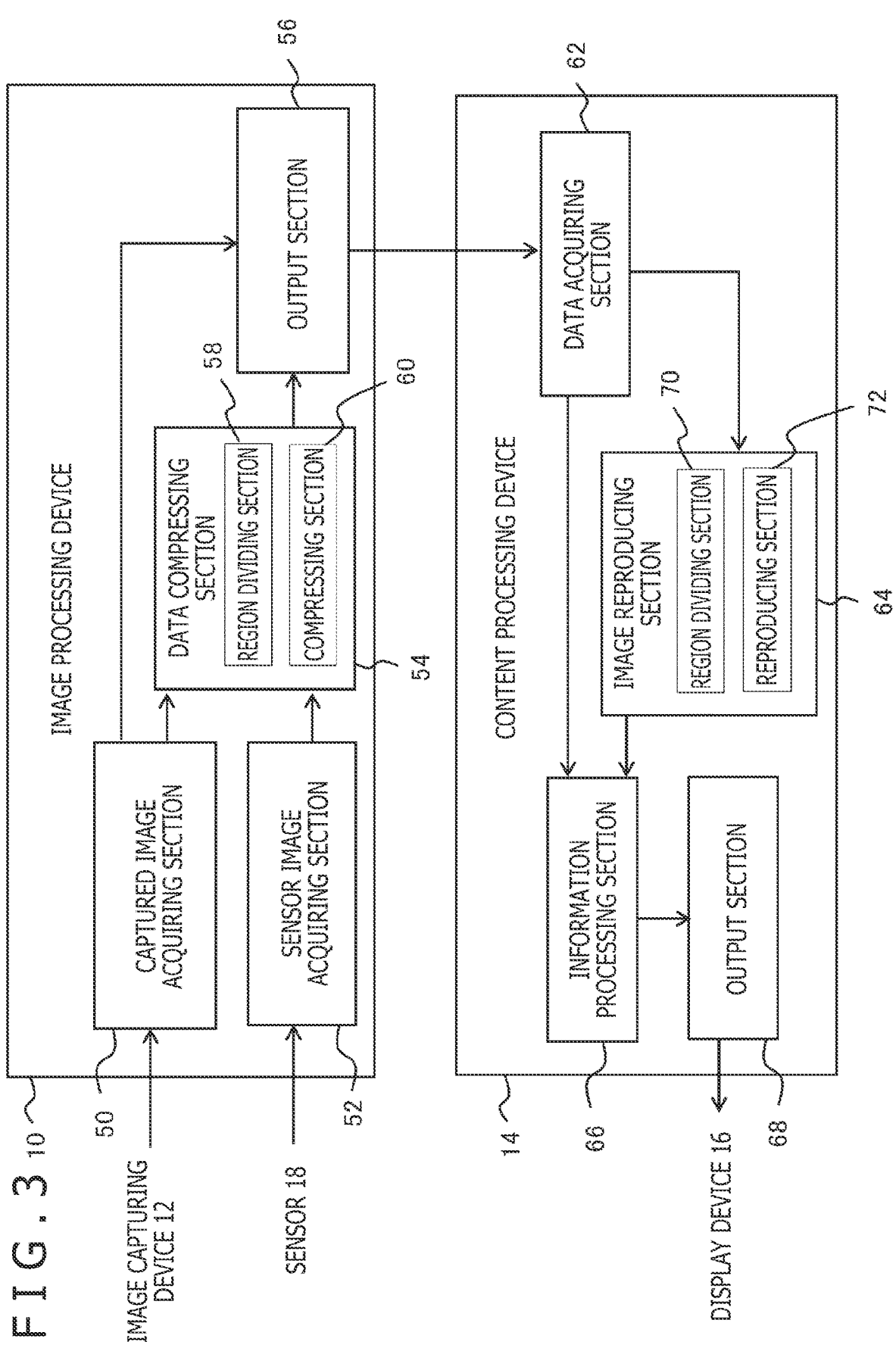
FIG. 3 is a diagram illustrating an arrangement of functional blocks of the image processing device and a content processing device according to the embodiment.

FIG. 3 illustrates an arrangement of functional blocks of the image processing device 10 and the content processing device 14. The functional blocks illustrated in FIG. 3 may be realized in terms of hardware by various circuits illustrated in FIG. 2 or in terms of software by programs loaded from the recording medium into the main memory and performing various functions including an image analyzing function, an information processing function, an image rendering function, data input/output function, etc. Therefore, these functional blocks may be realized in various forms by hardware only, software only, or a combination of hardware and software, which can be understood by those skilled in the art, and should not be limited to either hardware or software.

The image processing device 10 includes a captured image acquiring section 50 that acquires data of a captured image from the image capturing device 12, a sensor image acquiring section 52 that acquires data of a sensor image from the sensor 18, a data compressing section 54 that compresses the data of the captured image by using the sensor image, and an output section 56 that outputs the data of the compressed captured image and the sensor image. The captured image acquiring section 50 and the sensor image acquiring section 52 are each realized by the input unit 38, the CPU 23, and the main memory 26, etc., illustrated in FIG. 2. The captured image acquiring section 50 acquires data of a captured image, whereas the sensor image acquiring section 52 acquires data of a sensor image. Specifically, the captured image acquiring section 50 acquires a captured image representing a luminance distribution of visible light in a subject space. The sensor image acquiring section 52 acquires an image representing a distribution of measured values regarding a subject space that is different from the luminance distribution of visible light.

Preferably, the sensor image acquiring section 52 acquires a sensor image (e.g., a depth image) corresponding to a captured image. Therefore, in a case where a captured image is a moving image, the sensor image acquiring section 52 should preferably acquire a sensor image at a predetermined rate from the sensor 18. However, the rate at which a captured image is acquired and the rate at which a sensor image is acquired may not be the same as each other. The data compressing section 54 is realized by the CPU 23, the GPU 24, the main memory 26, and the like illustrated in FIG. 2, and compresses the data size of a captured image. In more detail, the data compressing section 54 includes a region dividing section 58 and a compressing section 60.

The region dividing section 58 divides the plane of a captured image into regions according to predetermined rules, on the basis of a sensor image. For example, in a case where a sensor image is a depth image, the region dividing section 58 divides the plane of a captured image into regions where pixel values in the depth image are smaller than a threshold value and regions where pixel values in the depth image are otherwise. In this fashion, the importance of the regions can be separated depending on the distance up to subjects, so that the level of detail of a subject farther than the threshold value or a subject closer than the threshold value can be reduced.

The region dividing section 58 determines which of the farther subject or the closer subject whose level of detail is to be reduced, depending on the situation in which the image is captured. For example, in a case where an image of a musical event is captured at a close distance, the level of detail of a subject behind the artist may be reduced. In a case where an image of a far child in a park or the like is captured, the level of detail of the foreground may be reduced.

Various standards may be taken into consideration as to the division into regions depending on the kind of a sensor image, the situation in which the image is captured, the kind of a subject, etc. For example, the captured image may be divided into regions depending on a distance, any one of a color, shape, temperature, and wavelength band, or a combination thereof. Further, the sensor image acquiring section 52 may acquire internal parameters of the image capturing device 12, and the region dividing section 58 may divide the captured image into regions on the basis of the internal parameters. The internal parameters may be an aperture value, a focal length, a focused position, the diagonal length of an image capturing plane, and so on.

A region that is in focus in the captured image is found from these parameters. Since images in other regions are originally not clear, it is considered that reducing the data of these regions has small effects. Therefore, the region dividing section 58 divides the captured image into regions by determining a region that is in focus on the basis of the range of the depth of focus or the like. As this process detects an image of a subject closer or farther than the range of the depth of field, it is essentially equivalent to the division into regions based on the distance up to the subject. The region dividing section 58 may divide the captured image according to an appropriate combination of the standards based on the internal parameters of the image capturing device 12 and the standards based on the sensor image.

Further, one boundary condition may be established with respect to those standards, and the captured image may be divided into two kinds of regions depending on whether or not they are important. Alternatively, two boundary conditions may be established, and the captured image may be divided into three kinds of regions corresponding to levels of importance. In any case, parameters as division standards and their boundary conditions are preset in the region dividing section 58. Alternatively, the parameters and boundary conditions may be made variable by, for example, user's settings or the results of an analysis of the captured image.

The compressing section 60 reduces data by lowering the level of detail of at least any of regions in the captured image divided by the region dividing section 58. The amount of data to be reduced from each region and the reducing method are established in advance. Alternatively, the amount of data to be reduced and the reducing method may be made variable by, for example, user's settings or the results of an analysis of the captured image. For example, in a situation where a subject closer to an image capturing plane is important, the data of the original captured image is maintained in a region, among the divided regions, that has pixel values smaller than a predetermined threshold value in the depth image, whereas the resolution or the number of gradations representative of pixel values is lowered in other regions.

Needless to say, in a situation where a farther subject is important, the data of the original captured image is maintained in a region that has pixel values larger than the predetermined threshold value in the depth image, whereas the resolution or the number of gradations representative of pixel values is lowered in other regions. In a case where there are two or more boundary conditions, the resolution and the degree to which the number of gradations is lowered are varied in two or more stages. The data of a region that is regarded as most important may not necessarily be maintained at its original level, and its resolution or number of gradations may be lowered at a lower reduction ratio in some cases. Further, as the means that reduces the data, a calculating method of compression-encoding or the granularity of quantization may be changed.

The output section 56 is realized by the CPU 23, the main memory 26, the communication unit 32, and the like which are illustrated in FIG. 2, and outputs the data of the captured image compressed by the data compressing section 54, together with the data of the sensor image. The output section 56 may output the data of the captured image and the sensor image after they have been compression-encoded or packetized by general means. The output section 56 may output the data to the content processing device 14 or to a recording medium that can be read by the content processing device 14. Alternatively, the output section 56 may store the data temporarily in the storage unit 34 of the image processing device 10 and then may send the data upon request from the content processing device 14.

The content processing device 14 includes a data acquiring section 62 that acquires the data of the captured image and the sensor image, an image reproducing section 64 that reproduces the captured image, an information processing section 66 that performs a predetermined information processing sequence by using the captured image, and an output section 68 that outputs data of display images and sounds generated as a result of the information processing sequence.

The data acquiring section 62 is realized by the communication unit 32, the CPU 23, the main memory 26, and the like which are illustrated in FIG. 2, and acquires the data of the compressed captured image and the sensor image from the image processing device 10. Specifically, the data acquiring section 62 acquires image data with different levels of detail in the regions of the captured image representing the luminance distribution of visible light in the subject space, and the information regarding the regions. In a case where the captured image is a moving image, the data acquiring section 62 successively acquires the captured image and the sensor image at a predetermined rate. In a case where the image data is supplied through a recording medium, the data acquiring section 62 successively reads the pieces of image data via the recording medium drive 40. Even in a case where a recording medium is used, the storage capacity for the data can be reduced according to the present embodiment. Note that, in a case where the acquired image data has been compression-encoded by a general method, the data acquiring section 62 decodes the image data. At this stage, however, the captured image has different resolutions and numbers of gradations (luminance spaces) of pixel values in the respective regions.

The image reproducing section 64 is realized by the CPU 23, the GPU 24, the main memory 26, and the like which are illustrated in FIG. 2, and reproduces the captured image that has different resolutions and numbers of gradations in the respective regions. In more detail, the image reproducing section 64 includes a region dividing section 70 and a reproducing section 72. The region dividing section 70 divides the plane of the captured image into regions according to predetermined rules on the basis of the sensor image, as with the region dividing section 58 of the image processing device 10. Needless to say, the rules for dividing the captured image are in common with the rules used by the region dividing section 58 of the image processing device 10.

The reproducing section 72 specifies the regions where the data of the compressed captured image has been reduced, from the result of the region division by the region dividing section 70, and restores the data to the original rendering format, thereby reproducing the captured image. For example, in a case where the resolution has been lowered, the reproducing section 72 inserts data so as to attain a number of pixels corresponding to the original resolution. In a case where the number of gradations of pixel values has been lowered, it is converted into a value as the original number of gradations. In such a manner, even if the level of detail of some regions is low, the image format can be restored to the original state.

The information processing section 66 is realized by the CPU 23, the GPU 24, the main memory 26, and the like which are illustrated in FIG. 2, and carries out a predetermined information processing sequence by using the reproduced captured image to generate output data. At this time, the information processing section 66 may use the sensor image such as a depth image. The information processing sequence performed by the information processing section 66 is not limited to any particular content. The output section 68 is realized by the CPU 23, the main memory 26, the output unit 36, and the like which are illustrated in FIG. 2, and outputs the output data including a display image and the like thus generated to the display device 16. Note that the image reproducing section 64 of the content processing device 14 may be provided as an image processing device independent of a device that performs a processing sequence with respect to games and display.

Figure 4:
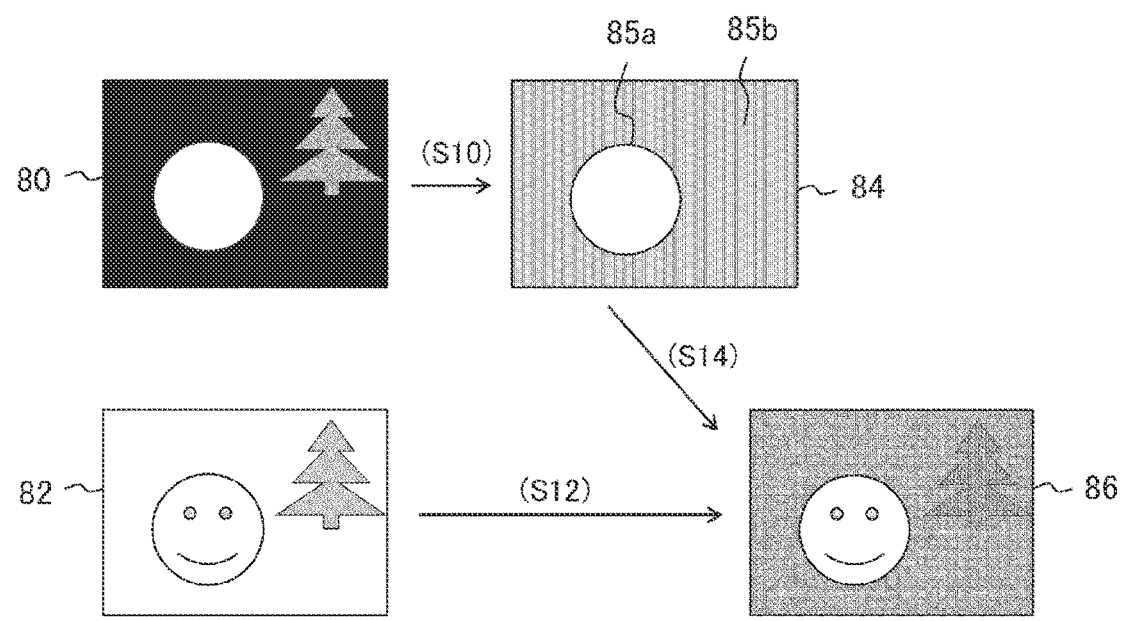
FIG. 4 is a diagram schematically illustrating an example of processing sequence performed by a data compressing section of the image processing device according to the embodiment.

FIG. 4 schematically illustrates an example of processing sequence performed by the data compressing section 54 of the image processing device 10. First, the data compressing section 54 acquires data of a captured image 82 and a depth image 80 that is an example of sensor image. As described above, the depth image 80 is an image where values representing distances from an image capturing plane up to subjects are held as pixel values of the images of the subjects in the captured image 82. In the illustrated example, the images of the subjects whose distances to the image capturing plane are smaller are indicated by larger luminance values. Further, if the angle of view of the depth image 80 is associated with the captured image 82 at the end as illustrated, then the initial measuring field of view of the sensor 18 may not agree with the field of view of the image capturing device 12.

The region dividing section 58 divides the image plane of the captured image 82 into regions by comparing the distance values indicated by the depth image 80 with a preset threshold value (S10). For example, a region where the distance value is smaller than the threshold value is regarded as an image of higher importance, and a region determined otherwise is regarded as an image of lower importance. In FIG. 4, the result of the region division is represented by a region-divided image 84 where the former region is rendered as a blank region 85a and where the latter region is rendered as a hatched region 85b. However, the information of the region division is not limited to the illustrated form.

The compressing section 60 generates a compressed captured image 86 where the data of the region 85b of lower importance in the captured image 82 is reduced by referring to the region-divided image 84 (S12, S14). In FIG. 4, the reduction of the data of the region corresponding to the region 85b is indicated by grey. The output section 56 compression-encodes and packetizes the data whose levels of detail are different depending on the positions on the image plane, as with the conventional art, and outputs the resultant data. Since the regions have different resolutions and different numbers of gradations, the content processing device 14 is required to perform a processing sequence based on such differences.

Figure 5:
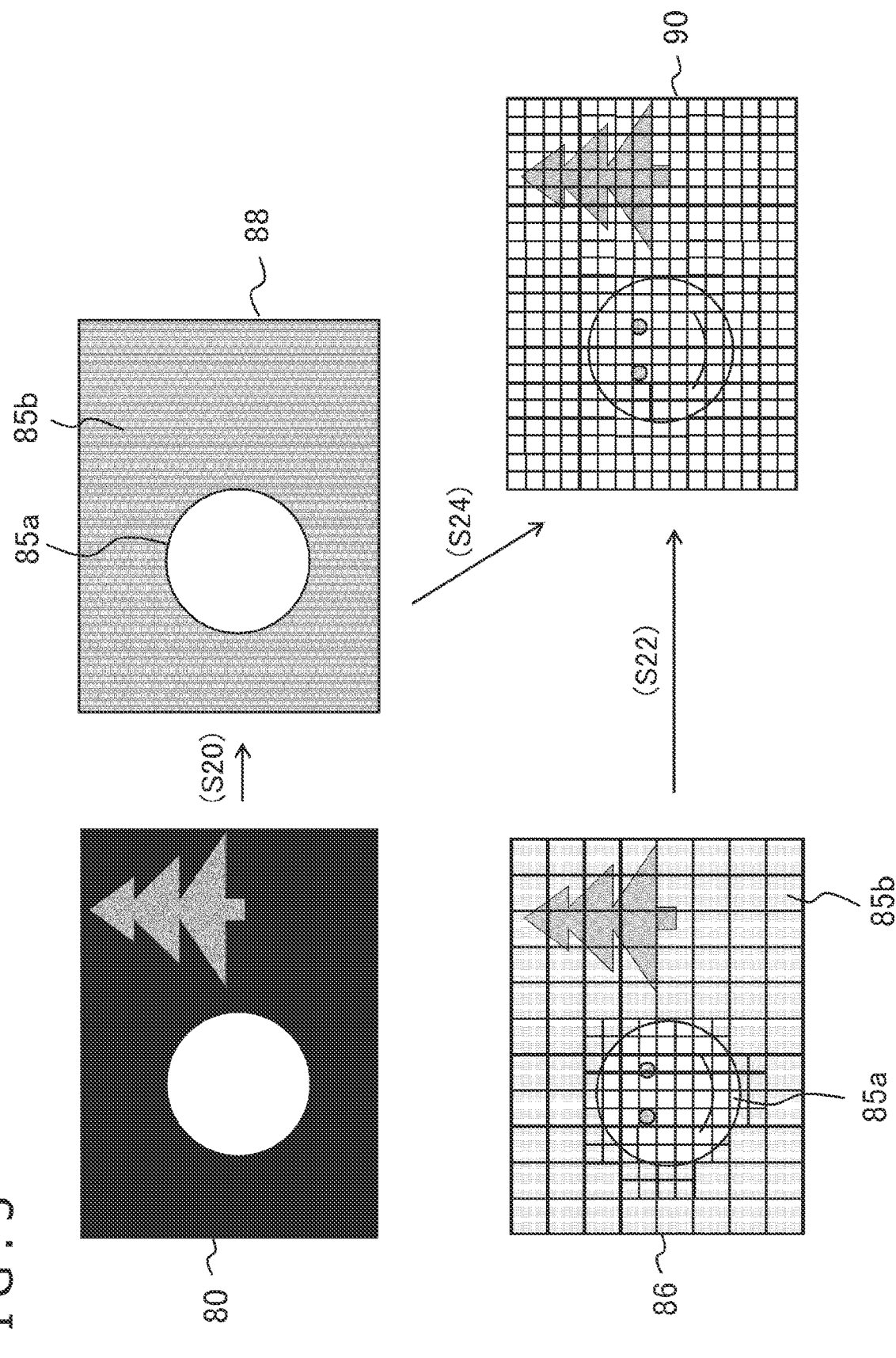
FIG. 5 is a diagram schematically illustrating an example of processing sequence performed by an image reproducing section of the content processing device according to the embodiment.

FIG. 5 schematically illustrates an example of processing sequence performed by the image reproducing section 64 of the content processing device 14. First, the image reproducing section 64 acquires the data of the compressed captured image 86 and the depth image 80 which is an example of sensor image. The compressed captured image 86 in this example is an image where the resolution of the region 85b other than the region 85a of higher importance is lowered. In FIG. 5, the lower resolution of the region 85b is represented by wider distances between grid lines indicating the boundaries between pixel areas. Note that, as illustrated, the region where the resolution is not lowered may not agree with the region 85a of higher importance insofar as it contains the region 85a of higher importance.

Further, at the stage in which the image reproducing section 64 acquires the data of the captured image 86, the data of the captured image 86 is not in a state to form the illustrated image. Specifically, since a data string representing pixel values is acquired successively from an upper left position in the image, for example, if the area of one pixel is different, then the correspondence to positional coordinates on the image plane is not determined. On the other hand, by using such data as a transmission target, the number of pixels forming an image is reduced, and the time required to transmit one frame of data is shortened.

The region dividing section 70 divides the image plane of the captured image 82 into regions by comparing the distance values indicated by the depth image 80 with a preset threshold value, as with the region dividing section 58 of the image processing device 10 (S20). Note that, in a case where the information processing section 66 performs an information processing sequence by using the depth image as described above, the information processing section 66 also uses the depth image 80 for the region division, so that the data to be sent from the image processing device 10 will not be increased. By diverting not only the depth image but also an image used for the purpose of information processing for use in the region division, an enhanced data reduction effect is achieved.

On the other hand, in some cases such as a case in which only the captured image is required in an information processing sequence, a region-divided image 88 may be sent from the image processing device 10. The reproducing section 72 restores the resolution of a region where the data is reduced, that is, a region whose resolution is low in FIG. 5, to the original resolution by referring to information of the divided region such as the region-divided image 88 (S22, S24). For example, in a case where the resolution is reduced to 1/N in vertical and horizontal directions, one pixel is converted into data of a group of pixels in N rows and N columns. The pixel values of the group of pixels may be the same as the pixel value of the original one pixel or may be determined by way of interpolation on the basis of the values of pixels therearound. A conventional technique is applicable to the interpolation. In this fashion, a reproduced image 90 having the same resolution as the resolution of the original captured image can be generated.

Figure 6:
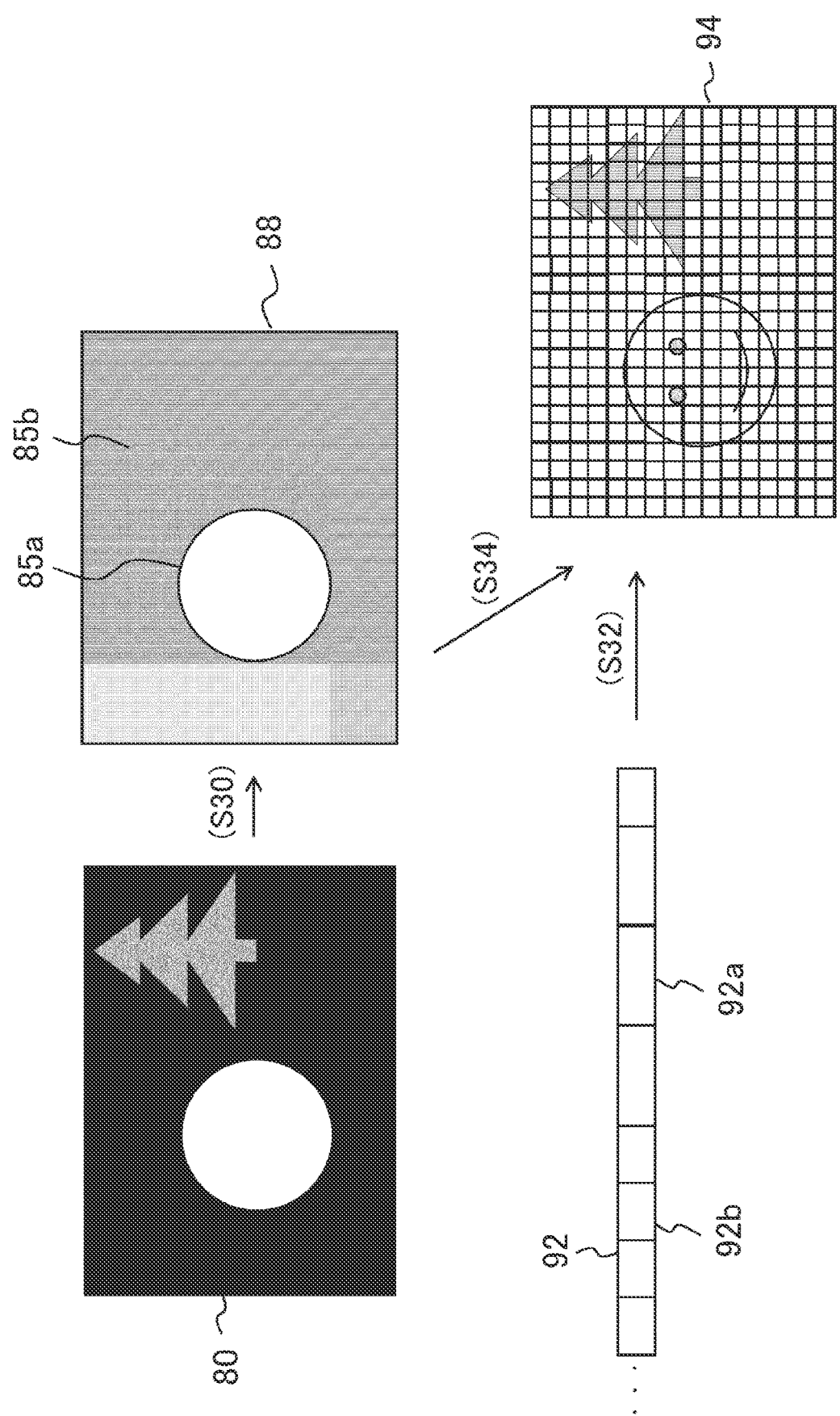
FIG. 6 is a diagram schematically illustrating another example of processing sequence performed by the image reproducing section of the content processing device according to the embodiment.

FIG. 6 schematically illustrates another example of processing sequence performed by the image reproducing section 64 of the content processing device 14. First, the image reproducing section 64 acquires data 92 of a compressed captured image and the data of the depth image 80 which is an example of sensor image. The data 92 of the captured image in this example has different numbers of gradations representing the pixel values of pixels in the respective regions. In FIG. 6, the different numbers of gradations are represented by the lengths of pixel values in a stream indicative of a pixel string. Specifically, a pixel value (e.g., a pixel value 92*a*) of the region 85*a* of higher importance is represented by the original number of gradations, whereas a pixel value (e.g., a pixel value 92*b*) of the other region 85*b* is represented by a smaller number of gradations.

Similarly, in this case, as the data length of each pixel in the stream data varies, the correspondence to positional coordinates on the image plane is not determined. On the other hand, since the data size representing the entire image is reduced, the time required to transmit one frame of data can be shortened. The region dividing section 70 divides the image plane of the captured image 82 into regions by comparing the distance values indicated by the depth image 80 with a preset threshold value (S30), as with the example illustrated in FIG. 5.

The reproducing section 72 restores the gradation rendering in a region where the number of gradations is lowered, to the original gradation rendering by referring to information of the divided region such as the region-divided image 88 (S32, S34). For example, in a case where the number of gradations is reduced to 1/M, that is, in a case where the original pixel values are multiplied by 1/M to express luminance, the luminance space is restored to the original luminance space by multiplying acquired pixel values by M. In this fashion, a reproduced image 94 where pixel values are expressed in the same luminance space as the original captured image can be generated.

As to the means that reduces the amount of data, such as the reduction of the resolution or the reduction of the number of gradations, any one of the pieces of means may be carried out, or the plural pieces of means may simultaneously be carried out. For example, with respect to a region of lower importance, the resolution may be lowered, and the number of gradations of the pixel values thereof may be lowered. In a case where the importance is divided into three or more stages, the data may be reduced by more pieces of means as the importance is lower. Alternatively, the means may not be varied, and the ratio of data reduction such as a reduction ratio for the resolution or a reduction ratio for the gradations may be increased stepwise. Further, the reducing means or reduction ratio for the data may be made different depending on the attributes of the subjects themselves.

Figure 7:
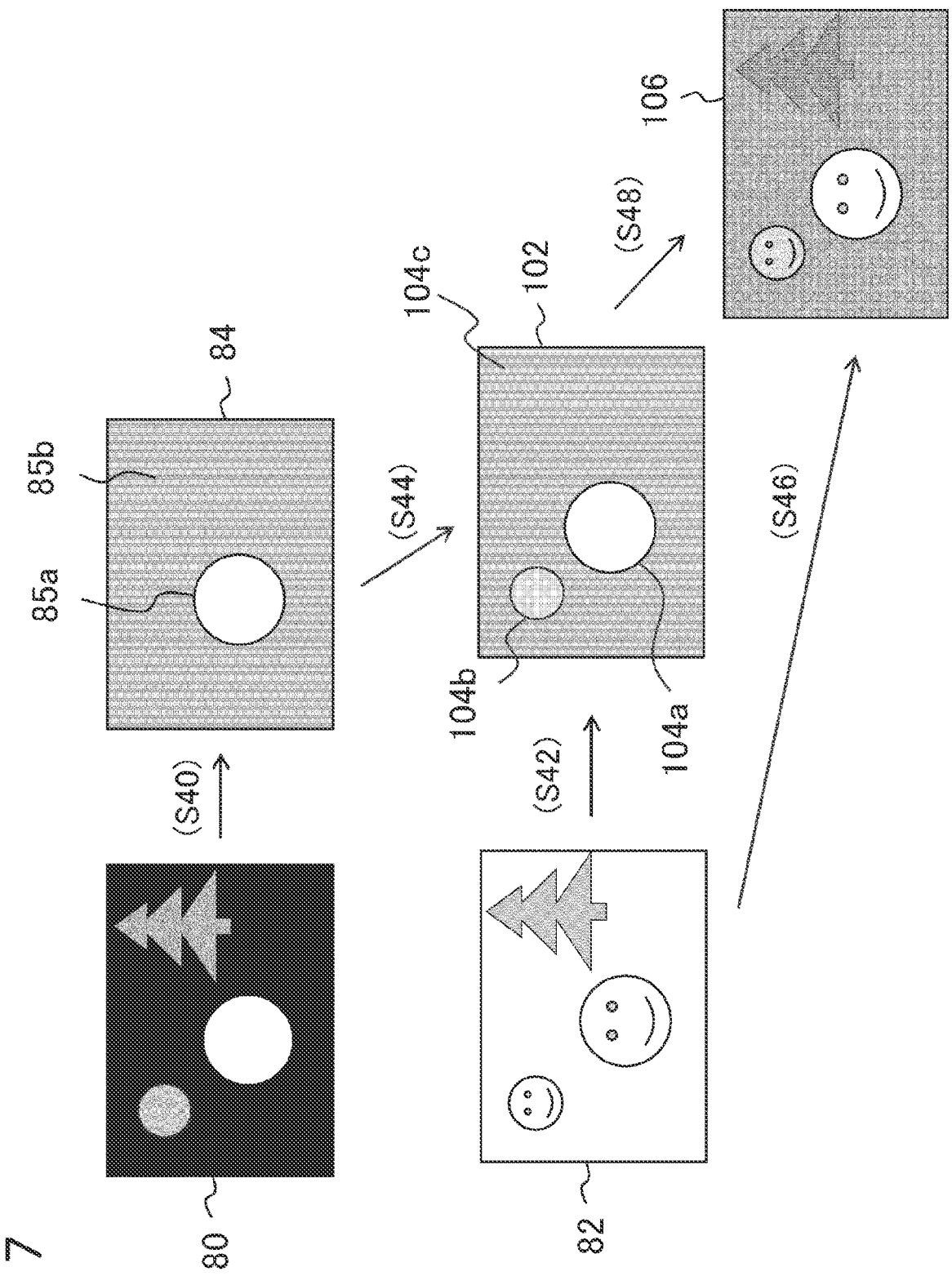
FIG. 7 is a diagram schematically illustrating a processing sequence performed by the data compressing section of the image processing device in a case where a data reduction ratio is altered according to attributes of subjects in the embodiment.

In this case, the compressing section 60 of the image processing device 10 has a subject recognizing function. FIG. 7 schematically illustrates a processing sequence performed by the data compressing section 54 of the image processing device 10 in a case where the reduction ratio of data is altered according to attributes of subjects. As with FIG. 4, the data compressing section 54 of the image processing device 10 acquires the data of the captured image 82 and the depth image 80 that is an example of sensor image. The region dividing section 58 divides the image plane of the captured image 82 into regions by determining the pixel values represented by the depth image 80 with respect to a threshold value (S40). As a result, a region-divided image 84 including a region 85*a* of the image of a subject closer to the image capturing plane and another region 85*b*, for example, is generated.

Meanwhile, the compressing section 60 performs a subject recognizing process on the captured image 82 to recognize subjects that are included as images (S42). For example, the compressing section 60 acquires regions 104*a* and 104*b* representing the images of faces in the captured image 82 according to a face detecting process. Note that the technique for recognizing a subject is not limited to face detection, and any techniques that have been put to use may be introduced. Further, images that are used should not be restricted by the technique used. For example, the depth image 80 may be used, or a multispectral image or a hyperspectral image may be used.

It may be determined whether or not the subjects are biological by using those images, or the subjects may be identified by referring to a database prepared in advance in the image processing device 10, a server, or the like, on the basis of appearance features such as shapes, colors, or patterns of the images. Further, a deep learning function for deriving what the subjects are on the basis of those features of the images may be incorporated in a server or the image processing device 10 for increased accuracy of subject recognition.

The compressing section 60 then determines data reduction ratios for the respective regions on the basis of information of the regions divided by the region dividing section 58 and the result of the subject recognition. In the illustrated example, the region 85b farther from the image capturing plane includes a region 104b representing the image of a person's face. In this case, with respect to the region 104b representing the image of the face, the data reduction ratio is made smaller than other regions in the region 85b. In other words, the level of detail of a biological image is made higher than the level of detail of the region therearound. As a result, there are formed three regions, that is, the region 85a (=104a) of the image of the subject closer to the image capturing plane, the region 104b farther from the image capturing plane with the face included therein, and another region 104c.

The compressing section 60 generates a compressed captured image 106 where the data of the captured image 82 have been reduced stepwise, by referring to a final region-divided image 102 (S46, S48). In FIG. 7, the images are illustrated in grey that is darker as the data reduction ratio is higher. In this case, if the reproducing section 72 of the content processing device 14 also has a subject recognizing function and detects the regions 104a and 104b representing the images of faces in a similar manner to the compressing section 60, then the captured image 82 can be reproduced by a process that is the reverse of the sequence illustrated in FIG. 7. Note that the subject recognizing function of the content processing device 14 may also include a function for identifying subjects by asking a server or performing deep learning on the basis of the features of the images.

In such a manner, importance is determined by taking into account actual subjects other than information such as distance values that can be acquired by the sensor 18, and the data reduction ratio can be adjusted depending on the importance thus determined. In the illustrated example, even if the distance from the image capturing plane is far, a certain level of detail can be maintained for human faces, and the data can be reduced while reducing effects on information processing and display using such a level of detail. Note that it can be understood by those skilled in the art that various importance settings such as those for making biological subjects more important than other subjects and making subjects of particular shapes and colors important may be considered.

In the examples described so far, reducing the resolution and the number of gradations of pixel values has been mainly described as data reducing means. On the other hand, in a case where images can be provided from a server or the like by a subject recognizing function, the amount of data may further be reduced by deleting the images of subjects themselves from a transmission target. FIG. 8 schematically illustrates a processing sequence performed by the data compressing section 54 of the image processing device 10 in a mode where the images of subjects are excluded from a transmission target by a subject recognizing function.

First, the data compressing section 54 of the image processing device 10 acquires the data of the captured image 82 and the depth image 80 that is an example of sensor image, as with the example illustrated in FIG. 7. The region dividing section 58 divides the image plane of the captured image 82 into regions by determining the pixel values represented by the depth image 80 with respect to a threshold value (S50). As a result, a region-divided image 84 including a region 85a of the image of a subject closer to the image capturing plane and another region 85b, for example, is generated.

Meanwhile, the compressing section 60 performs a subject recognizing process on the captured image 82 to recognize subjects that are included as images (S52). As a result, a region 112a representing the image of a face and a region 112b representing the image of a juice can are detected. The detection is not limited to any particular detecting method in a similar manner as described above. Here, the compressing section 60 confirms, as part of the subject recognizing process or after the subject recognizing process, whether or not objects that seem to agree with the detected regions as to color, pattern, shape, etc., are registered in a database 120a (S54). The database 120a holds data of images, three-dimensional models, feature quantities, identification information, etc., in association with objects as subject candidates, and is prepared in the image processing device 10 or a server that can be connected via the network 8.

Any of checking techniques that have been put to use may be used to determine whether or not objects agree with the detected regions. The compressing section 60 determines data reduction ratios for the respective regions on the basis of information of the regions divided by the region dividing section 58 and the result of the subject recognition. Here, in a case where a recognized subject is registered in the database 120a, the compressing section 60 converts the pixel values of the region 112b representing the image of the subject into invalid data. For example, the compressing section 60 converts all of the pixel values of the region into a predetermined value of "0," for example. As a result, there are formed three regions, that is, the region 85a (=112a) of the image of the subject closer to the image capturing plane, the region 112b farther from the image capturing plane and representing the image of the subject registered in the database 120a, and another region 112c.

Note that even a subject that is close to the image capturing plane may be excluded in some cases from a transmission target by replacing itself with an image registered in the database 120a. The compressing section 60 generates a compressed captured image 114 where the data of the captured image 82 have been reduced by referring to a final region-divided image 110 (S56, S58). At this time, with respect to the image excluded from the transmission target as the subject is registered in the database 120a, metadata 116 representing identification information of the subject and information regarding the position thereof is simultaneously generated. In the illustrated example, the metadata 116 indicating commercial name "AA JUICE" and positional coordinates in a three-dimensional space is generated.

Note that, providing an image or model data can be acquired from the database and plotted on an image plane when the image is to be reproduced, the information to be expressed as metadata is not limited to the illustrated format. The information to be expressed as metadata may include a position on the image plane, a scaling factor of the image, a display angle, ratios of change of saturation and lightness, etc., for example. In a case where a three-dimensional model of a subject is stored in the database, the metadata 116 may include information of the posture of the subject. The information of the posture can be predicted by the compressing section 60 from the shape or the like of the image in the captured image 82. Alternatively, in an environment where an image of a subject with a built-in motion sensor is captured, the compressing section 60 may acquire a measured value from the motion sensor, derive the posture of the subject from the measured value, and include the posture in the metadata.

FIG. 9 schematically illustrates a sequence in which data generated by the processing sequence illustrated in FIG. 8 is reproduced by the image reproducing section 64 of the content processing device 14. First, the image reproducing section 64 acquires the data of the compressed captured image 114, the metadata 116, and the data of the depth image 80 which is an example of sensor image. The region dividing section 70 divides the image plane of the captured image 114 into regions by determining the distance values represented by the depth image 80 with respect to a threshold value, as with the region dividing section 58 of the image processing device 10 (S60).

The reproducing section 72 reproduces the data of the region 85b where the amount of data has been reduced, according to the process described with reference to FIGS. 5 and 6 by referring to information of the divided region such as the region-divided image 88 (S62, S64). Further, the reproducing section 72 asks a database 120b on the basis of the metadata 116, and generates a reproduced captured image 122 by plotting an image of a region where the invalid data is substituted in the captured image 114 (S66). In a case where three-dimensional models of subjects are stored in the database 120b, a perspective transformation is carried out on the basis of the three-dimensional coordinates indicated by the metadata 116, and an image is plotted on the image plane. In a case where two-dimensional images of subjects are stored in the database 120b, a two-dimensional image is mapped onto the image plane.

The database 120b is prepared in the content processing device 14 or a server that can be connected via the network 8. Needless to say, the database 120a that the image processing device 10 refers to and the database 120b that the content processing device 14 refers to store the same information, and may be one database of one server, for example. Further, in a case where one subject appears successively in a number of frames as is the case with a moving image, once the content processing device 14 acquires the data of the subject, it is possible for the content processing device 14 to subsequently plot an image at a high speed without referring to the database 120b.

According to the present embodiment described above, in a system that performs an information processing sequence by using a captured image, information suggesting the importance of subjects is acquired when the image is captured, and different levels of detail of images are established in respective regions on the basis of the acquired information. In such a manner, the data of the captured image can be reduced while maintaining the original amount of information with respect to an important region. As a result, the amount of data transmitted per frame can be reduced, and the time required to transmit the data can be shortened. Even in an image capturing environment where the position and direction of a viewpoint tends to change as is the case with an image capturing device incorporated in a head-mounted display, for example, it is possible to display an image that immediately reacts to the field of view of a captured image while maintaining the level of detail of an important region.

In addition, model data and images of subject candidates are registered in a database, and in a case where a subject specified by a subject recognizing process performed on an actual captured image is registered in the database, the image processing device transmits the captured image from which the image of the subject has been deleted. The content processing device acquires the data of the subject from the database by referring to the database, and plots the image of the subject on the captured image transmitted from the image processing device, so that the amount of data transmitted per frame can further be reduced. The transmission speed is thus increased to maintain the time required for an information processing sequence, thereby increasing the accuracy of the information processing sequence and a displayed image.

The present invention has been described on the basis of the embodiment thereof. The above embodiment is illustrated by way of example, and it can be understood by those skilled in the art that various changes and modifications can be made in combinations of the components and processing processes of the embodiment and that such changes and modifications fall within the scope of the invention.

REFERENCE SIGNS LIST

1 Content processing system
10 Image processing device
12 Image capturing device
14 Content processing device
16 Display device
18 Sensor
23 CPU
24 GPU
26 Main memory
32 Communication unit
34 Storage unit
36 Output unit
38 Input unit
40 Recording medium drive
50 Captured image acquiring section
52 Sensor image acquiring section
54 Data compressing section
56 Output section
58 Region dividing section
60 Compressing section
62 Data acquiring section
64 Image reproducing section
66 Information processing section
68 Output section
70 Region dividing section
72 Reproducing section

INDUSTRIAL APPLICABILITY

As described above, the present invention is applicable to various devices including an image capturing device, a head-mounted display, a sensor, an image processing device, a content reproducing device, etc., and a system including those devices.

The invention claimed is:
1. An electronic device comprising:
a captured image acquiring section that acquires a captured image representing a luminance distribution of visible light in a subject space;
a sensor image acquiring section that acquires an image representing a distribution of measured values regarding the subject space that is different from the luminance distribution of the visible light;
a data compressing section that carries out a subject recognizing process based on the captured image or the image representing the distribution of the measured values, deletes an image of a subject found as a result of the subject recognizing process and registered in a database thereby to reduce data from the captured image, and generates, as metadata, information necessary to plot the deleted image in the captured image by using image data stored in the database; and an output section that outputs the captured image from which the data has been reduced, information regarding a region of the deleted image, and the metadata.

2. The electronic device according to claim 1, wherein the sensor image acquiring section acquires a depth image representing a distance up to a subject as a pixel value, and the data compressing section divides the captured image into regions on a basis of boundary conditions on the distance up to the subject and establishes different levels of detail for the respective regions thereby to reduce the data from the captured image.

3. The electronic device according to claim 1, wherein the sensor image acquiring section acquires information regarding a focal point in the captured image, and the data compressing section divides the captured image into regions by determining a region that is in focus, and establishes different levels of detail for the respective regions thereby to reduce the data from the captured image.

4. The electronic device according to claim 2, wherein the data compressing section reduces the data from the captured image by lowering a resolution or the number of gradations representing pixel values in at least any one of the regions.

5. The electronic device according to claim 1, wherein the sensor image acquiring section acquires a multispectral image or a hyperspectral image including a wavelength band other than the visible light.

6. The electronic device according to claim 1, wherein the data compressing section carries out the subject recognizing process based on the captured image or the image representing the distribution of the measured values and determines a level of detail of an image of a recognized subject.

7. The electronic device according to claim 6, wherein the data compressing section makes a level of detail of a biological image found as a result of the subject recognizing process higher than a level of detail of a region around the biological image.

8. The electronic device according to claim 1, wherein the data compressing section carries out the subject recognizing process by using a deep learning function that predicts a subject on a basis of the captured image or the image representing the distribution of the measured values.

9. A content processing device comprising:
a data acquiring section that acquires data of a captured image that represents a luminance distribution of visible light in a subject space and from which an image of a subject registered in a database has been deleted, information regarding a region of the deleted image, and metadata necessary to plot the deleted image;

an image reproducing section that reproduces the data of the captured image by plotting the deleted image by referring to the database, on a basis of the information regarding the region and the metadata; and an output section that generates and outputs output data by using the reproduced data of the captured image.

10. The content processing device according to claim 9, wherein
the data of the captured image acquired by the data acquiring section has different resolutions or different numbers of gradations representing pixel values in respective regions, the data acquiring section further acquires information regarding the regions, and the image reproducing section carries out an insertion of pixels or a transformation of the pixel values to cause a region in which a resolution or the number of gradations representing the pixel values is low to match another region.

11. A content processing system comprising:
an electronic device that transmits a captured image representing a luminance distribution of visible light in a subject space; and a content processing device that generates output data by using the captured image, wherein the electronic device includes a captured image acquiring section that acquires the captured image, a sensor image acquiring section that acquires an image representing a distribution of measured values regarding the subject space that is different from the luminance distribution of the visible light, a data compressing section that carries out a subject recognizing process based on the captured image or the image representing the distribution of the measured values, deletes an image of a subject found as a result of the subject recognizing process and registered in a database thereby to reduce data from the captured image, and generates, as metadata, information necessary to plot the deleted image in the captured image by using image data stored in the database, and an output section that outputs the captured image from which the data has been reduced, information regarding a region of the deleted image, and the metadata, and the content processing device includes
a data acquiring section that acquires the data of the captured image from which the image has been deleted, the information regarding the region of the deleted image, and the metadata, an image reproducing section that reproduces the data of the captured image by plotting the deleted image by referring to the database, on a basis of the information regarding the region and the metadata, and an output section that generates and outputs output data by using the reproduced data of the captured image.

12. An image data outputting method of outputting image data with an electronic device, comprising:
acquiring a captured image representing a luminance distribution of visible light in a subject space;

acquiring an image representing a distribution of measured values regarding the subject space that is different from the luminance distribution of the visible light;

carrying out a subject recognizing process based on the captured image or the image representing the distribution of the measured values, and deleting an image of a subject found as a result of the subject recognizing process and registered in a database thereby to reduce data from the captured image;

generating, as metadata, information necessary to plot the deleted image in the captured image by using image data stored in the database; and outputting the captured image from which the data has been reduced, information regarding a region of the deleted image, and the metadata.

13. An image processing method of processing an image with a content processing device, comprising:
acquiring data of acquiring data of a captured image that represents a luminance distribution of visible light in a subject space and from which an image of a subject registered in a database has been deleted, information regarding a region of the deleted image, and metadata necessary to plot the deleted image;

reproducing the data of the captured image by plotting the deleted image by referring to the database, on a basis of the information regarding the region and the metadata; and generating and outputting output data by using the reproduced data of the captured image.

\* \* \* \* \*